United States Patent
Kahn

(10) Patent No.: US 10,771,853 B2
(45) Date of Patent: Sep. 8, 2020

(54) SYSTEM AND METHOD FOR CAPTION MODIFICATION

(71) Applicant: ARRIS Enterprises LLC, Suwanee, GA (US)

(72) Inventor: Michael R. Kahn, Cherry Hill, NJ (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/366,043

(22) Filed: Dec. 1, 2016

(65) Prior Publication Data

US 2018/0160190 A1 Jun. 7, 2018

(51) Int. Cl.
| | |
|---|---|
| *H04N 7/08* | (2006.01) |
| *H04N 5/445* | (2011.01) |
| *H04N 21/488* | (2011.01) |
| *H04N 21/485* | (2011.01) |
| *H04N 21/431* | (2011.01) |
| *H04N 21/422* | (2011.01) |
| *H04N 21/472* | (2011.01) |

(52) U.S. Cl.
CPC ..... *H04N 21/4884* (2013.01); *H04N 5/44513* (2013.01); *H04N 21/42221* (2013.01); *H04N 21/4312* (2013.01); *H04N 21/4316* (2013.01); *H04N 21/4318* (2013.01); *H04N 21/47217* (2013.01); *H04N 21/4854* (2013.01); *H04N 21/4858* (2013.01); *H04N 5/44591* (2013.01); *H04N 2005/44526* (2013.01)

(58) Field of Classification Search
CPC ........... H04N 21/4884; H04N 5/44513; H04N 5/44591

USPC ....... 348/468, 465, 563, 564, 569, 473, 461; 725/40, 137, 136

See application file for complete search history.

(56) References Cited

U.S. PATENT DOCUMENTS

| | | | |
|---|---|---|---|
| 7,616,264 B1 * | 11/2009 | Greenberg | H04N 5/445 348/564 |
| 8,736,761 B2 * | 5/2014 | Kendall | H04N 5/44513 348/473 |

(Continued)

OTHER PUBLICATIONS

PCT International Search Report & Written Opinion, RE: Application No. PCT/US2017/062169, dated Mar. 12, 2018.

*Primary Examiner* — Jefferey F Harold
*Assistant Examiner* — Jean W Desir
(74) *Attorney, Agent, or Firm* — Wenderoth, Lind & Ponack, L.L.P.

(57) ABSTRACT

A device is provided for use with a viewing device that operable to display a video. The device includes: an image receiver to receive image data; a closed caption receiver to receive closed caption data; an image decoder to decode the image data into image display data; a closed caption decoder to decode the closed caption data into closed caption display data; a packaging component to generate a first content package based on the image display data and the closed caption display data; an output port to output the first content package to the viewing device to display a first video image over a first period of time; an instruction receiver to receive a closed caption modification instruction and to output an image modification signal based on the closed caption modification instruction; and a closed caption modifying component to generate modified closed caption display data.

14 Claims, 11 Drawing Sheets

(56) References Cited

U.S. PATENT DOCUMENTS

| | | | |
|---|---|---|---|
| 2002/0075403 A1* | 6/2002 | Barone, Jr. | H04N 5/44513 |
| | | | 348/461 |
| 2003/0169369 A1* | 9/2003 | Kahn | H04N 5/44513 |
| | | | 348/468 |
| 2004/0252234 A1 | 12/2004 | Park | |
| 2006/0017845 A1* | 1/2006 | Onomatsu | H04N 5/44504 |
| | | | 348/468 |
| 2006/0170824 A1 | 8/2006 | Johnson et al. | |
| 2011/0064387 A1 | 3/2011 | Mendeloff et al. | |
| 2015/0381906 A1* | 12/2015 | Lenzi | H04N 5/278 |
| | | | 348/468 |
| 2016/0014476 A1 | 1/2016 | Caliendo et al. | |
| 2016/0100121 A1 | 4/2016 | Shintani et al. | |

\* cited by examiner

SYSTEM AND METHOD FOR CAPTION MODIFICATION

BACKGROUND

Embodiments of the present invention relate to devices and methods to display closed caption data.

Closed captioning is a process by which text is displayed on a video screen or other visual display to provide additional or interpretive information. In a conventional closed captioning system, the audio portion of a program is transcribed in real time (for live events) or before the content is broadcast (for pre-recorded events or programs). When a user turns on the closed captioning option, the transcription is shown on the video screen at the appropriate time such that the text matches what is happening on the video. Closed captioning is typically activated when the user is hard of hearing or the video screen is in a very loud area, and viewers are unable to hear the audio portion of the content.

FIG. 1 illustrates a conventional content delivery system.

As shown in the figure, system 100 includes a content provider 102 and a residence 104. Residence 104 further includes a set top box 106 and a viewing device 108.

Content provider 102 is arranged to communicate with set top box 106 via a communication channel 101. Set top box 106 is additionally arranged to communicate with viewing device 108 via a communication channel 103.

Content provider 102 may be any type of content provider that delivers content by known methods. Examples of content providers include satellite television providers, cable television providers, and internet television providers.

Set top box 106 is operable to communicate bidirectionally with provider 102, and to provide video data to viewing device 108. Viewing device 108 is operable to receive video data from set top box 106 and display the video data on a screen for a viewer. Viewing device 108 may be any device that is capable of displaying video data, including, but not limited to, televisions, desktop or laptop computers, or mobile devices such as cellular phones or tablet computers.

Communication channel 101 and communication channel 103 may be any known type of wired or wireless communication channel that enables transfer of data from one point to another.

In operation, set top box 106 receives commands from the user and transmits those commands to provider 102. The user provides commands to set top box 106 by any conventional means, including using a remote control to transmit an infrared signal, pressing buttons on the set top box, or any other means that may be employed to transmit a signal from the user to the set top box. For example, the user may want to change a channel, and press the "channel up" button on the remote control. The remote control would send an infrared signal to the set top box, which would send the signal to provider 102. Provider 102 would then send video data for the desired channel to set top box 106, and set top box 106 would provide the video data for the desired channel to viewing device 108. The user would then see the content associated with the desired channel.

FIG. 2 illustrates a conventional viewing device.

As shown in the figure, viewing device 108 includes a display 202. Display 202 includes an image 204 and text 206.

Display 202 is operable to show the viewer the desired content. The desired content may include only images, or it may include both images and text. For example, if the viewer chose to watch a football game, image 204 may include a football player, and text 206 may include the game information, including the score, quarter, and time remaining.

FIG. 3 illustrates a conventional viewing device with closed captioning.

As shown in the figure, viewing device 108 includes a display 302. Display 302 includes image 204, text 206, and a closed caption 304.

While watching the game, the viewer may choose to activate closed captioning. After pressing the "closed caption" button on the remote control, closed caption 304 is displayed on the screen. While the viewer is now able to read what the announcers are saying, the viewer is no longer able to see text 206.

There exists a need for a system and method for viewing closed caption text and the desired content without obscuring the closed caption text or the desired content.

SUMMARY

The present invention provides a system and method for viewing closed caption text and the desired content without obscuring the closed caption text or the desired content.

An aspect of the present invention is drawn to device for use with a viewing device that operable to display a video. The device includes: an image receiver operable to receive image data; a closed caption receiver operable to receive closed caption data; an image decoder operable to decode the image data into image display data; a closed caption decoder operable to decode the closed caption data into closed caption display data; a packaging component operable to generate a first content package based on the image display data and the closed caption display data; an output port operable to output the first content package to the viewing device to display a first video image over a first period of time; an instruction receiver operable to receive a closed caption modification instruction and to output an image modification signal based on the closed caption modification instruction; and a closed caption modifying component operable to generate modified closed caption display data. The packaging component can further, based on the image modification signal, generate a second content package based on the image display data and the modified closed caption display data. The output port can further output the second content package to the viewing device to display a second video image over a second period of time.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

The present invention provides a device and method to allow a viewer to modify the location, size, opacity and combinations thereof, of a closed caption display, and to provide the ability to view previous content that was obscured by the closed caption display. While watching content that includes a closed caption display, when the closed caption display obscures content the viewer desires to see, the viewer may be able to change the location, size, or opacity of the closed caption display so the viewer can see the desired content. If the viewer missed something from the content that was previously displayed, the viewer may also be able to modify the location, size, or opacity of a closed caption display and rewind the content to the desired point, such that the viewer can view the desired content that was previously obscured by a closed caption display.

The invention provides an improved content viewing experience because, unlike a conventional closed caption display, the viewer is able to modify the appearance and/or location of a closed caption display in order to see the desired content. This eliminates viewer frustration and displeasure.

Aspects of the present invention will now be described with reference to FIGS. 4-13. A first example embodiment will first be described with reference to FIGS. 4-8.

Figure 4:
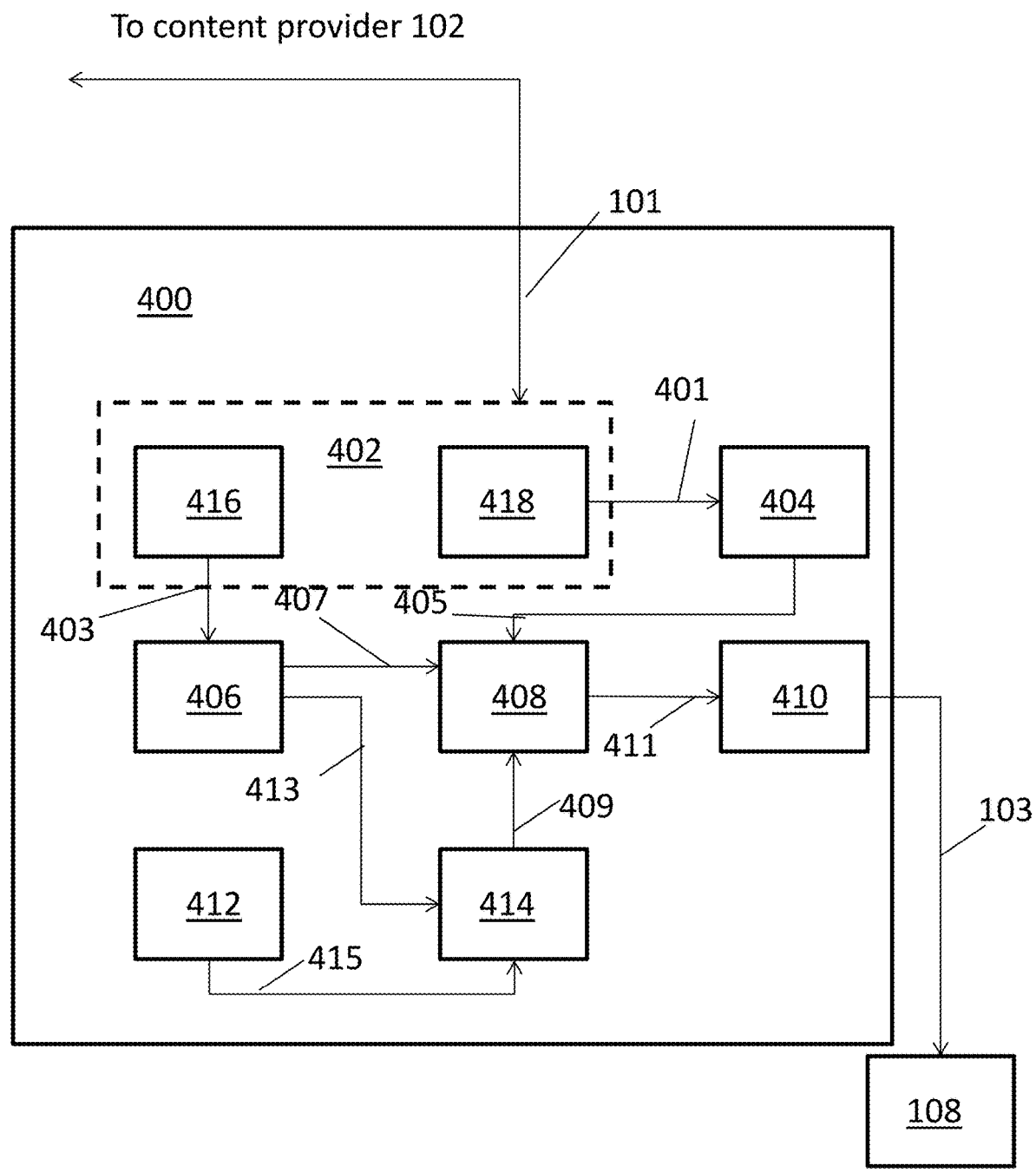
FIG. 4 illustrates a device for providing content to a viewer in accordance with aspects of the present invention.

FIG. 4 illustrates a device and a viewing device for providing content to a viewer in accordance with aspects of the present invention.

As shown in the figure, device 400 includes a receiver 402, an image decoder 404, a closed caption decoder 406, a packaging component 408, an output port 410, an instruction receiver 412 and a closed caption modifying component 414. Additionally shown in the figure is viewing device 108. Receiver 402 further includes a closed caption receiver 416 and an image receiver 418.

In this example, closed caption receiver 416 and image receiver 418 are illustrated as individual devices. However, in some embodiments, closed caption receiver 416 and image receiver 418 may be combined as a unitary device. Further, in some embodiments, at least one of closed caption receiver 416 and image receiver 418 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, SD cards, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

In this example, receiver 402, image decoder 404, closed caption decoder 406, packaging component 408, output port 410, instruction receiver 412 and closed caption modifying component 414 are illustrated as individual devices. However, in some embodiments, at least two of receiver 402, image decoder 404, closed caption decoder 406, packaging component 408, output port 410, instruction receiver 412 and closed caption modifying component 414 may be combined as a unitary device. Further, in some embodiments, at least one of receiver 402, image decoder 404, closed caption decoder 406, packaging component 408, output port 410, instruction receiver 412 and closed caption modifying component 414 may be implemented as a computer having tangible computer-readable media for carrying or having computer-executable instructions or data structures stored thereon.

Receiver 402 is arranged to communicate with content provider 102 (not shown) via communication channel 101, is arranged to communicate with image decoder 404, via a communication channel 401, and is arranged to communicate with closed caption decoder 406 via a communication channel 403. More specifically, image receiver 418 is arranged to communicate with image decoder 404 via communication channel 401 and closed caption receiver 416 is arranged to communicate with closed caption decoder 406 via communication channel 403.

Image decoder 404 is additionally arranged to communicate with packaging component 408 via a communication channel 405. Packaging component 408 is additionally arranged to communicate with closed caption decoder 406 via a communication channel 407, to communicate with closed caption modifying component 414 via a communication channel 409 and to communicate with output port 410 via a communication channel 411.

Closed caption decoder 406 is additionally arranged to communicate with caption modifying component 414 via a communication channel 413. Caption modifying component 414 is additionally arranged to communicate with instruction receiver 412 via a communication channel 415.

Output port 410 is additionally arranged to communicate with viewing device 108 via communication channel 103.

Receiver 402 is operable to receive data from content provider 102. The content from content provider 102 may include content data for viewing as video and closed caption image data to be superimposed onto the video associated with the content data. The encoding/decoding methods used during transmission and receipt may be any known methods. For purposes of discussion of aspects of the present invention, it should be noted that, while any method of transmitting/receiving content data and closed caption data, the content data and closed caption data will be parsed upon receipt at device 400. To simplify the discussion, receiver 402 includes: closed caption receiver 416 that receives the closed caption data from content provider 102 and provides the closed caption data to closed caption decoder 406 via communication channel 403; and image receiver 418 that receives image data from content provider 102 and provides the image data to image decoder 404 via communication channel 401.

Image decoder 404 is operable to receive image data from image receiver 418 and decode the image data into image display data, and to provide the image display data to packaging component 408 via communication channel 405. For example, if original image data was encoded in an MPEG format before being provided by content provider 102, image decoder 404 will decode the received MPEG image data back into the original image data. The decoded image data is then provided to packaging component 408.

Closed caption decoder 406 is operable to receive closed caption data from closed caption receiver 416 and decode the closed caption data into closed caption display data, and to provide the closed caption display data to packaging component 408 via communication channel 407 and to closed caption modifying component 414 via communication channel 413. For example, if original closed caption data was encoded in an MPEG format before being provided by content provider 102, closed caption decoder 406 will decode the received MPEG closed caption data back into the original closed caption data. The decoded closed caption data is then provided to packaging component 408.

Instruction receiver 412 is operable to receive a closed caption modification instruction and generate an image modification signal based on the closed caption modification instruction, and to provide the image modification signal to closed caption modifying component 414. For example, instruction receiver 412 may receive an instruction from a remote control (not shown) of a user of device 400, wherein the user wants device 400 to perform a specific function, non-limiting examples of which include changing the channel, modifying the closed caption on the image, etc. The instruction may be from any known type of signal that includes one the group consisting of an infrared transmission and an RF transmission. In accordance with aspects of the present invention, when the received instruction is an instruction to modify the closed caption, or a closed caption modification instruction, then instruction receiver 412 provides the image modification signal to closed caption modifying component 414 via communication channel 415.

Closed caption modifying component 414 is operable to receive closed caption display data from closed caption decoder 406 and the image modification signal from instruction receiver 412, and generate modified closed caption display data. Closed caption modifying component 414 then provides the modified closed caption display data to packaging component 408 via communication channel 409. In other words, in an example embodiment, closed caption modifying component 414 receives the closed caption data and modifies the closed caption data when instructed by instruction receiver 412.

Packaging component 408 is operable to receive image display data from image decoder 404, closed caption data from closed caption decoder 406, and modified closed caption display data from closed caption modifying component 414. Packaging component 408 creates content packages based on the image display data, closed caption data, and modified closed caption display data, and provides the content packages to output port 410.

If there is no closed caption data, then packaging component 408 creates content packages based only on the image display data. If there is closed caption data and no modified closed caption display data, the packaging component 408 creates content packages based on the image display data and the closed caption data. If there is closed caption data and modified closed caption display data, the packaging component 408 creates content packages based on the image display data and the modified closed caption display data.

Output port 410 is operable to receive content packages from packaging component 408 and provide content packages to viewing device 108 to be displayed.

Communication channels 401, 403, 405, 407, 409, 411, 413 and 415 may be any known type of wired or wireless communication channel that enables transfer of data from one point to another.

The operation of device 400 and viewing device 108 will be further described with reference to FIGS. 5-8.

Figure 5:
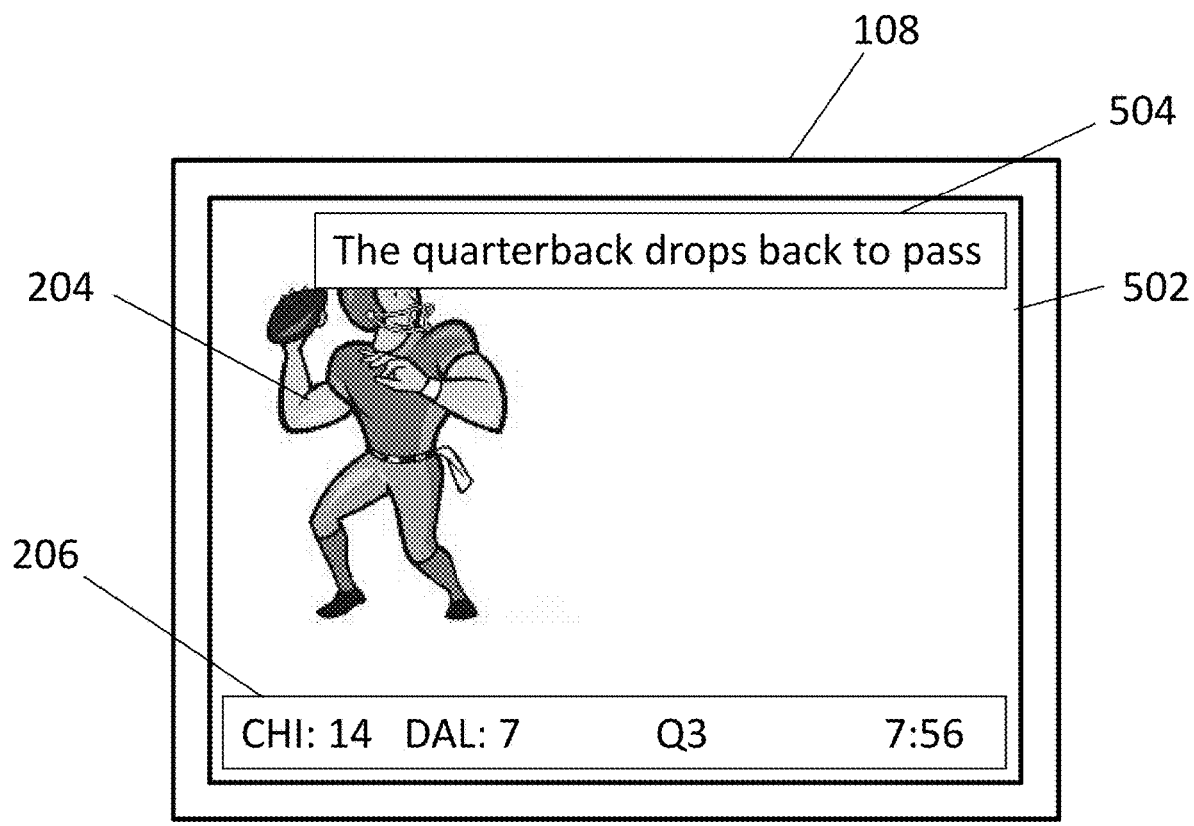
FIG. 5 illustrates a viewing device with closed captioning in a different position in accordance with aspects of the present invention.

FIG. 5 illustrates a viewing device with closed captioning in a different position in accordance with aspects of the present invention.

As shown in the figure, viewing device 108 includes display 502 and closed caption 504.

Figure 3:
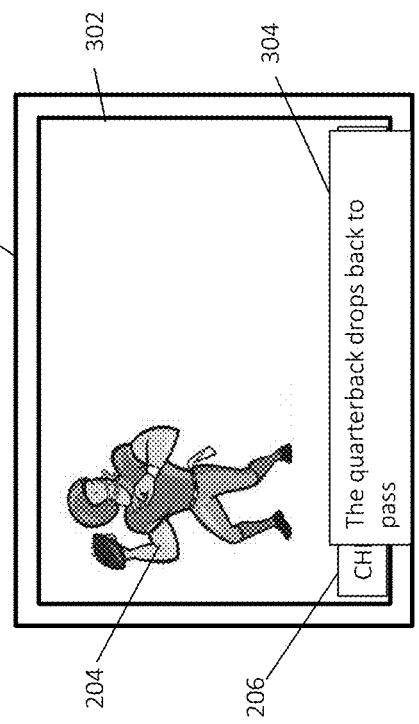
FIG. 3 illustrates a conventional viewing device with closed captioning.

Consider a non-limiting example situation, where a user is watching viewing device 108 and controlling device 400 by way of a remote control. Further, for purposes of discussion, presume that device 400 and viewing device 108 are enabled to display closed captions. When the viewer first chooses to display a closed caption on the screen and presses the appropriate button on the remote control, the viewer may initially be presented with a situation in which the closed caption box obscures some of text 206, as shown in FIG. 3. However, the viewer desires to see text 206, so he may issue an instruction via the remote control to move the closed caption box to another location, so as not to block parts of the display that the user wishes to see. In this example, the user wishes to see text 206.

The example of FIG. 5 shows closed caption 504 at the top of display 502. However, this is a non-limiting example of an alternative location for moving the closed caption 504. In accordance with aspects of the present invention, closed caption 504 may be moved to any location within display 502 and is not limited by the location shown in the figure. With closed caption 504 in a different location, the viewer is now able to see text 206.

Figure 6:
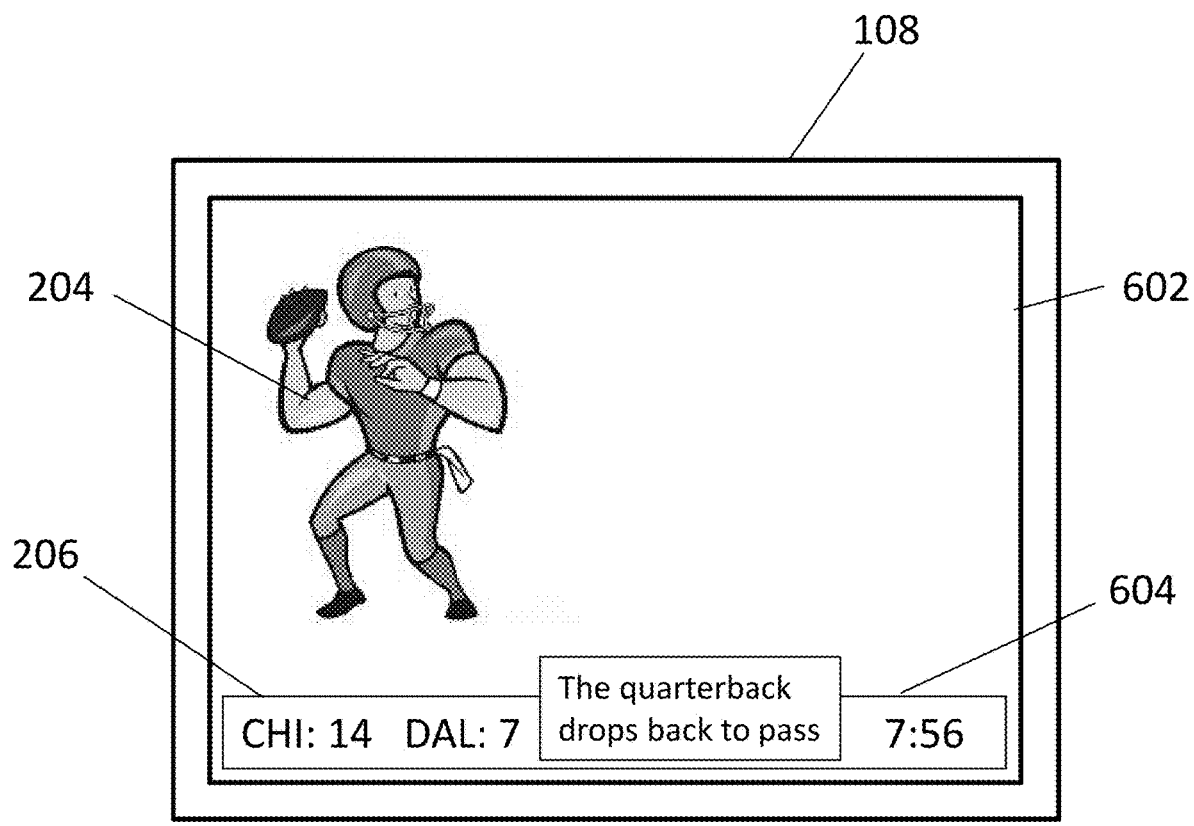
FIG. 6 illustrates a viewing device with a different size closed captioning in accordance with aspects of the present invention.

FIG. 6 illustrates a viewing device with a different size closed captioning in accordance with aspects of the present invention.

As shown in the figure, viewing device 108 includes display 602 and closed caption 604.

Again, when the viewer first chooses to display a closed caption on the screen and presses the appropriate button on the remote control, the viewer may initially be presented with a situation in which the closed caption box obscures some of text 206, as shown in FIG. 3. However, in this example the viewer desires to see some, or all, of text 206, so he may issue an instruction via the remote control to change the size of closed caption box. FIG. 6 shows closed caption 604 as a smaller box that is approximately half the size of closed caption 304.

The example of FIG. 6 shows closed caption 604 at approximately half the size of closed caption 304. However, this is a non-limiting example of size of closed caption 604. In accordance with aspects of the present invention, closed caption 604 may be any size that provides the viewer the ability to view the desired content or text.

Figure 7:
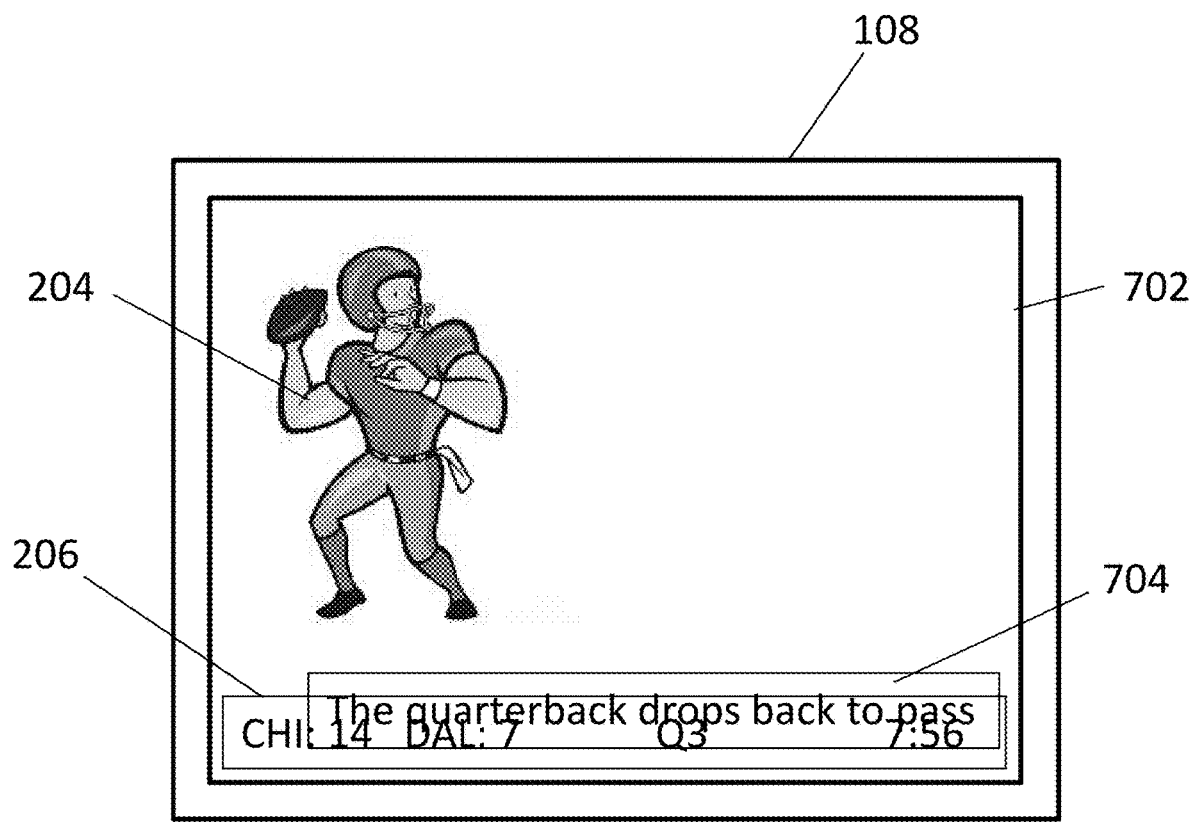
FIG. 7 illustrates a viewing device with a transparent closed captioning in accordance with aspects of the present invention.

FIG. 7 illustrates a viewing device with a transparent closed captioning in accordance with aspects of the present invention.

As shown in the figure, viewing device 108 includes display 702 and closed caption 704. Yet again, when the viewer first chooses to display a closed caption on the screen and presses the appropriate button on the remote control, the viewer may initially be presented with a situation in which the closed caption box obscures some of text 206, as shown in FIG. 3. However, the viewer desires to see some, or all, of text 206, so he may issue an instruction via the remote control to change the opacity of the closed caption box. FIG. 7 shows closed caption 704 as being fully transparent, however closed caption 704 may be of any opacity that the user deems to be acceptable to see both text 206 and closed caption 704.

The ability to move, remove, resize, or change the opacity of a closed caption box are not mutually exclusive. A viewer may choose to modify a closed caption box in any known manner, including the three ways described above, and combinations thereof.

In an alternate embodiment, the viewer may choose to remove a closed caption altogether, but only for a short period of time. In such cases, the viewer would send the instruction for a short term closed caption removal, in which case the closed caption would be removed from the screen, but would return in the same position after a predetermined amount of time. The amount of time may be selected by the viewer or the content provider.

Figure 8:
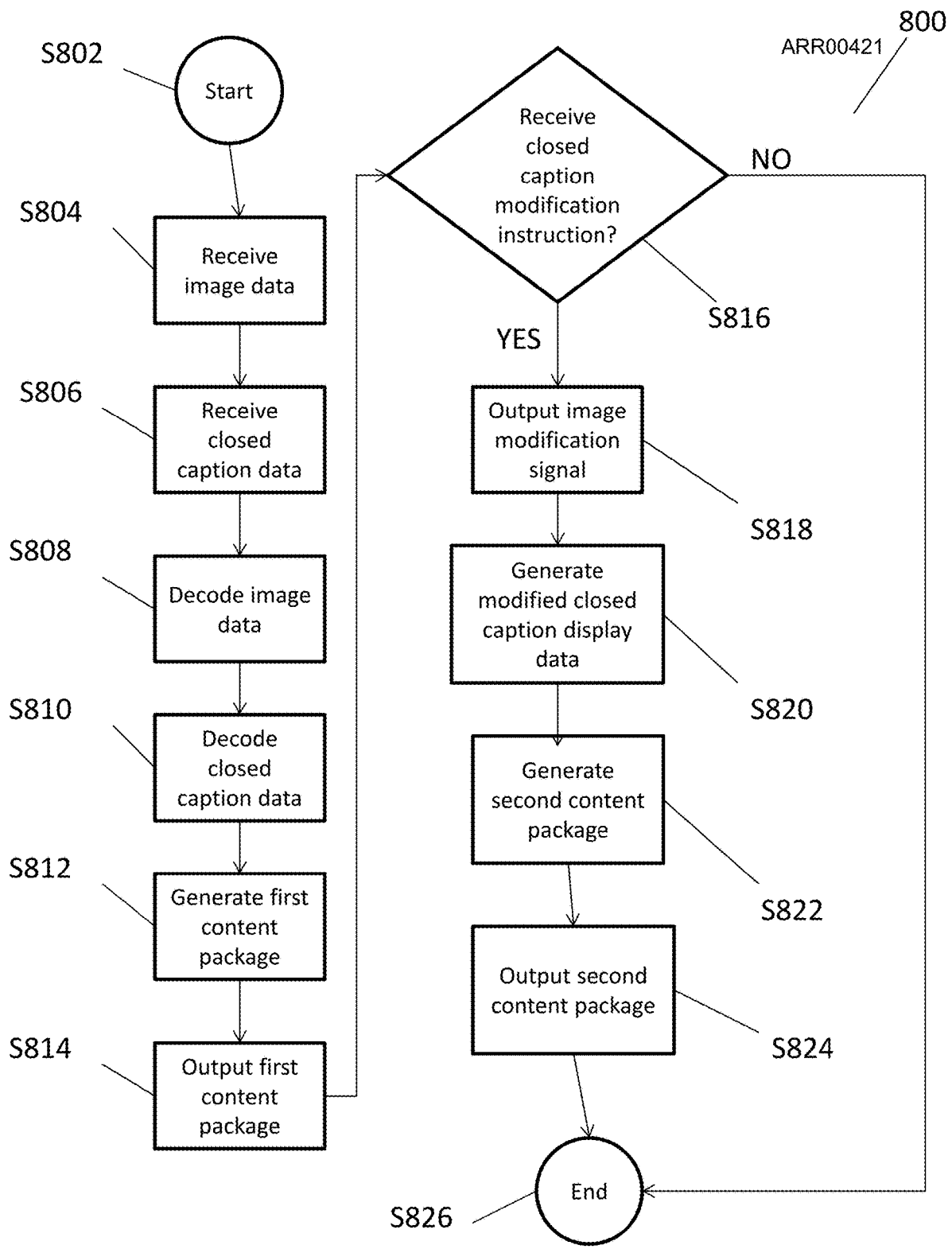
FIG. 8 illustrates an example method to provide different content to viewers based on viewer preference.

FIG. 8 illustrates an example method to provide different content to viewers based on viewer preference.

A viewer may be watching one type of content and decide to change to watch some other content. As a non-limiting example, the viewer may choose to watch a football game and issues an instruction to the set top box to change the channel in order to watch a football game.

As shown in FIG. 8, method 800 starts (S802) and image data is received (S804). For example, returning to FIG. 4, image receiver 418 receives image data for the football game from content provider 102. Image receiver 418 then provides the image data to image decoder 404.

Referring back to FIG. 8, closed caption data is received (S806). Returning to FIG. 4, closed caption receiver 416 receives closed caption data for the football game from content provider 102. Closed caption receiver 416 then provides the closed caption data to closed caption decoder 406.

As mentioned previously, the method of receiving image data and closed caption data from content provider may be any known method. As such, receiving the image data (S804) may occur after receiving the closed caption data (S806). Further, receiving the image data (S804) may occur at the same time as receiving the closed caption data (S806). In accordance with aspects of the present invention, the image data and the closed caption data are received.

Returning to FIG. 8, image data is decoded (S808) and closed caption data is decoded (S810). Referring back to FIG. 4, image decoder 404 decodes image data to generate image display data and provides image display data to packaging component 408. Closed caption decoder 406 decodes closed caption data to generate closed caption display data and provides closed caption display data to packaging component 408 and closed caption modifying component 414.

Again, as mentioned previously, the method of receiving image data and closed caption data from content provider may be any known method. As such, decoding of the image data (S808) may occur after decoding of the closed caption data (S810). Further, decoding of the image data (S808) may occur at the same time as decoding of the closed caption data (S810). In accordance with aspects of the present invention, the image data and the closed caption data are decoded.

Returning to FIG. 8, a first content package is generated (S812). Returning to FIG. 4, packaging component packages the image display data and closed caption display data together to create a first content package that includes both data and sends the first content package to output port 410.

Figure 1:
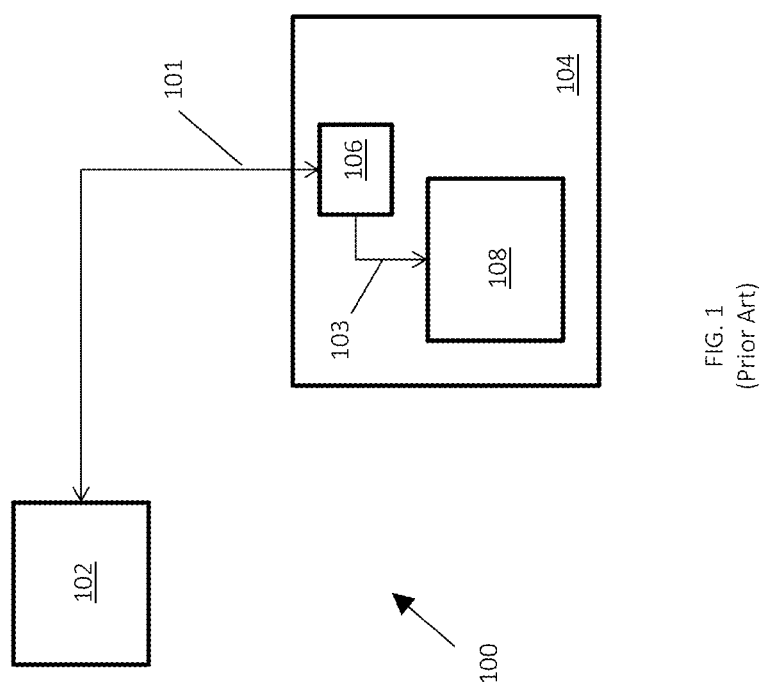
FIG. 1 illustrates a conventional content delivery system.
Figure 2:
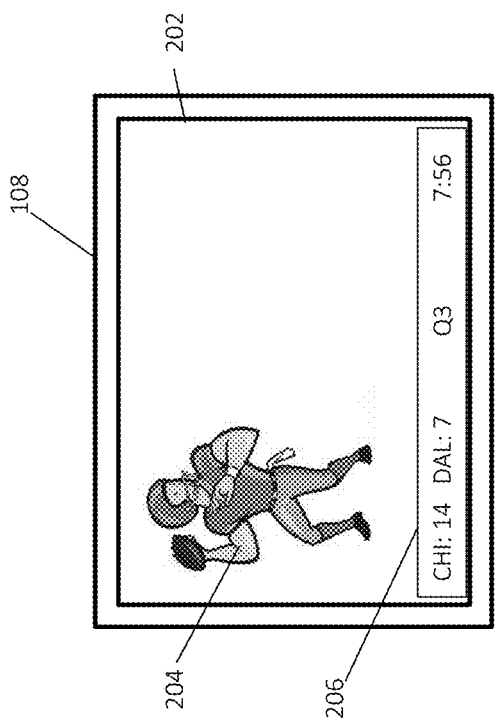
FIG. 2 illustrates a conventional viewing device and viewing device.

As mentioned previously, if there is no closed caption display data, the first content package is merely the image data associated with the video image. For example, FIG. 2 shows an example situation where there is no closed caption data in the first content package. Alternatively, if there is closed caption display data, the first content package is a combination of the image data associated with the video image and the closed caption data. For example, FIG. 3 shows an example situation where there is closed caption data in the first content package.

Referring back to FIG. 8, the first content package is then output to the viewer (S814). Returning to FIG. 4, output port 410 sends the first content package to viewing device 108. Referring to FIG. 3, the viewer is now able to see the first content package on display 302, including image 204, text 206, and closed caption 304. Closed caption 304 is blocking text 206, though, and the viewer must decide whether to keep closed caption 304 where it is, or to issue an instruction to modify it.

Returning to FIG. 8, if the viewer determines that it does not matter if text 206 is covered, no closed caption modification instruction is issued (NO at S816) and method 800 ends (S826). In such a situation, device 400 would continue to display the image with the conventional close captioning.

However, the viewer may determine that he does not like the position of closed caption 304 and would like to move it to another location so he can see text 206. The viewer would then use his remote control to issue a closed caption modification instruction (YES at S816) to move closed caption 304 to a different location.

The image modification signal is then output (S818). For example, referring back to FIG. 4, instruction receiver 412 receives the viewer's closed caption modification instruction and provides the modification signal to closed caption modifying component 414.

Returning to FIG. 8, modified closed caption display data is generated (S820). Referring back to FIG. 4, closed caption modifying component 414 receives the modification signal and generates modified closed caption display data based on the modification signal. Closed caption modifying component 414 modifies the closed caption display data provided by closed caption decoder 406. As discussed above, the modifications to the data will a result in a modified closed caption box in any known manner, including the three ways described above with reference to FIGS. 5-7, and combinations thereof. The modified closed caption display data is then sent to packaging component 408.

Returning to FIG. 8, a second content package is generated (S822). Returning to FIG. 4, packaging component 408 packages the image display data and the modified closed caption display data together to create a second content package that includes both data and sends the second content package to output port 410. Here, upon receipt of the modified closed caption display data, the second content package replaces the first content package.

Referring back to FIG. 8, the second content package is then output to the viewer (S824). Returning to FIG. 4, output port 410 sends the second content package to viewing device 108. Referring to FIG. 5, the viewer is now able to see the second content package on display 502, including image 204, text 206, and closed caption 504. The viewer can now see all of text 206 instead of just a portion of it, and closed caption 504 at the same time.

In alternate embodiments, the viewer may choose to modify the closed caption to change its size, as shown in FIG. 6, to change its opacity, as shown in FIG. 7, or to remove the closed caption entirely. In yet other alternate embodiments, the viewer may choose to modify the closed caption in any of the ways described, but only for a short period of time, after which the content displayed would return to its original format. The process by which the closed caption is modified, though, would be the same except for the specific instruction as to how the closed caption should be modified. Therefore, the process described above will apply to any modification instructions initiated by the viewer.

Returning to FIG. 8, method 800 ends (S826).

Some set top boxes have storage capabilities that enable trick plays, such as rewinding of streamed content. Aspects of the present invention capitalize this rewinding ability to ensure that a viewer will not miss any part of the displayed content as a result of closed captioning. This will be described with greater detail with reference to FIGS. 9-13.

Figure 9:
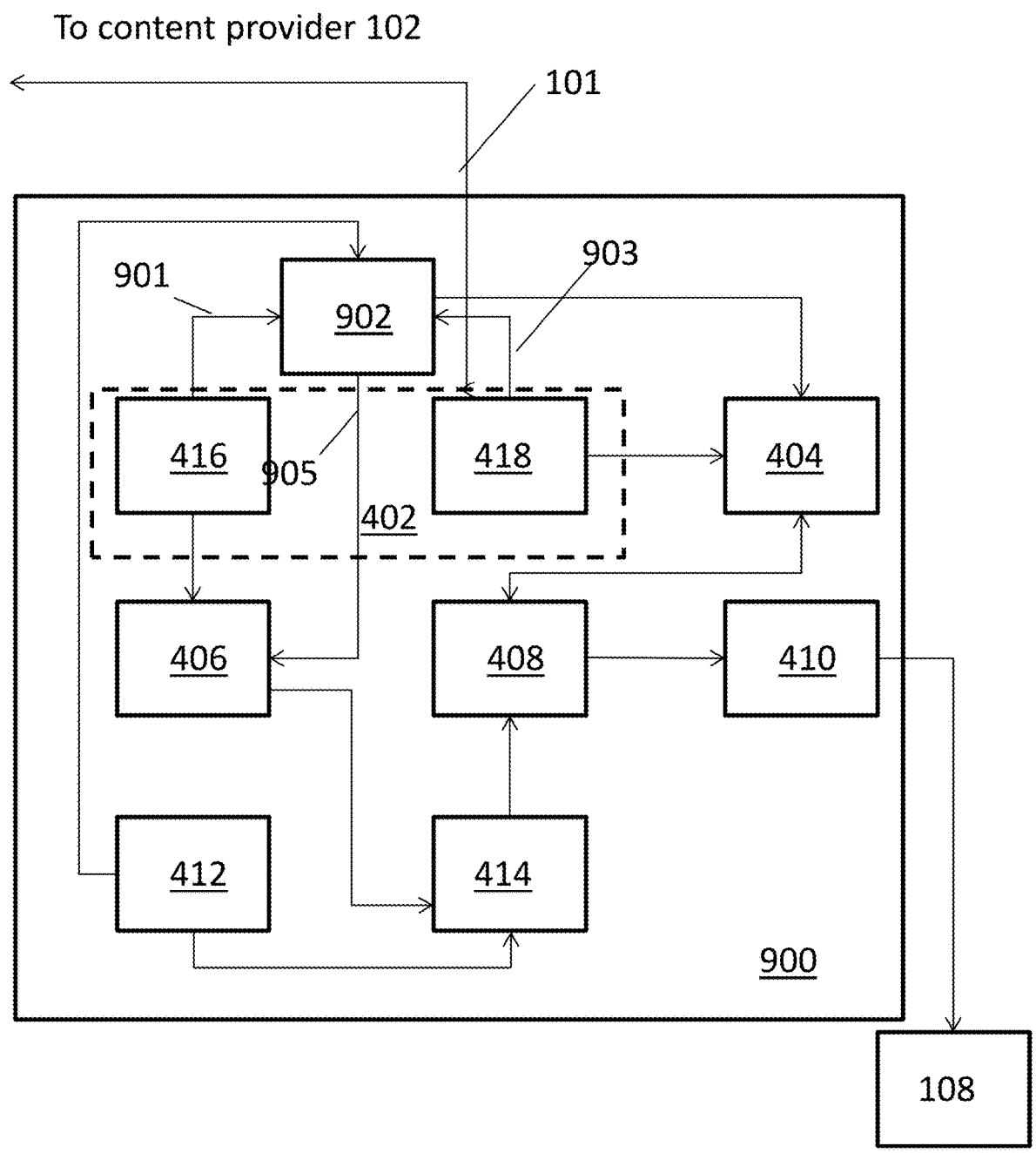
FIG. 9 illustrates a device for providing content to a viewer in accordance with aspects of the present invention.

FIG. 9 illustrates another example device for providing content to a viewer in accordance with aspects of the present invention.

As shown in the figure, device 900 includes all elements of device 400 with the addition of a memory 902.

Memory 902 is arranged to communicate with closed caption receiver 416 via a communication line 901, to communicate with image receiver 418 via a communication line 903 and to communicate with closed caption decoder 406 via a communication line 905.

Memory 902 is operable to receive and store closed caption data and image data from closed caption receiver 416 and image receiver 418, respectively, and to provide the stored closed caption data and image data to closed caption decoder 406 and image decoder 404, respectively. Memory 902 may be any known type of memory that is able to store, manage and retrieve data, non-limiting examples of which include flash memory, ROM, PROM, EPROM, and EEPROM.

In this example, memory 902, receiver 402, image decoder 404, closed caption decoder 406, packaging component 408, output port 410, instruction receiver 412, closed caption modifying component 414, and viewing device 108 are illustrated as individual devices. However, in some embodiments, at least two of memory 902, receiver 402, image decoder 404, closed caption decoder 406, packaging component 408, output port 410, instruction receiver 412, closed caption modifying component 414, and viewing device 108 may be combined as a unitary device. Further, in some embodiments, at least one of memory 902, receiver 402, image decoder 404, closed caption decoder 406, packaging component 408, output port 410, instruction receiver 412, closed caption modifying component 414, and viewing device 108 may be implemented as a computer having tangible computer-readable media for carrying or having computer-executable instructions or data structures stored thereon.

Figure 10:
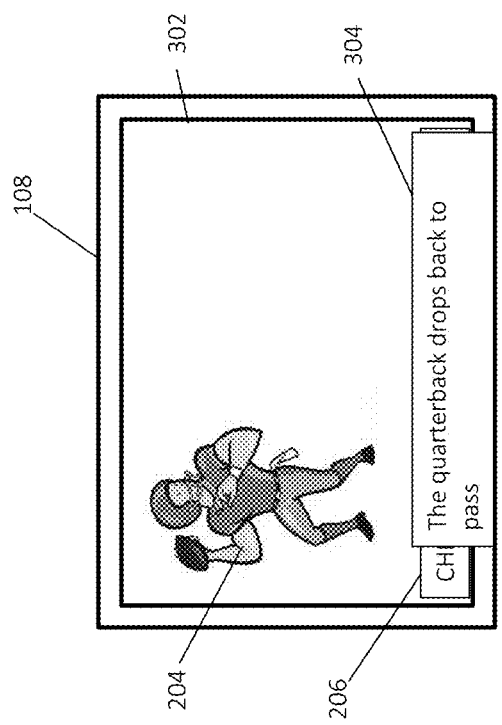
FIG. 10 illustrates conventional a viewing device.

FIG. 10 illustrates a viewing device.

As shown in the figure, when the viewer first chooses to display a closed caption on the screen and presses the appropriate button on the remote control, the viewer may initially be presented with a situation in which closed caption 304 obscures some, or all, of text 206. The viewer may want to view text 206, though, and he may issue an instruction to modify closed caption 304 such that he can view text 206. A problem may arise, though, due to the temporal nature of determining that closed caption 304 should be modified and when the modification is executed. In other words, by the time the viewer decides that he needs to modify the closed caption, he has already missed something important in the video image. Such problems will be further described with reference to FIG. 11.

Figure 11:
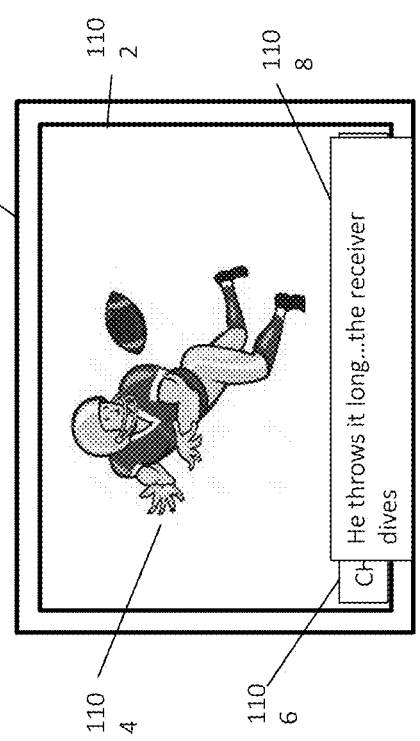
FIG. 11 illustrates the conventional viewing device of FIG. 10 at a later time.

FIG. 11 illustrates the viewing device of FIG. 10 at a later time.

As shown in the figure, viewing device 108 includes display 1102, image 1104, text 1106, and closed caption 1108. If a viewer is viewing display 302 of FIG. 10 and determines that he wants to move the closed caption box to see text 206, by the time he sends the instruction to move the box, text 206 may have changed such that the viewer will not be able to see what he actually desired to see. Instead, the viewer may see text 1106 from a later portion of the content. This can be very frustrating to a viewer as he will miss the desired content. The remedy for this problem will be further described with reference to FIG. 12.

Figure 12:
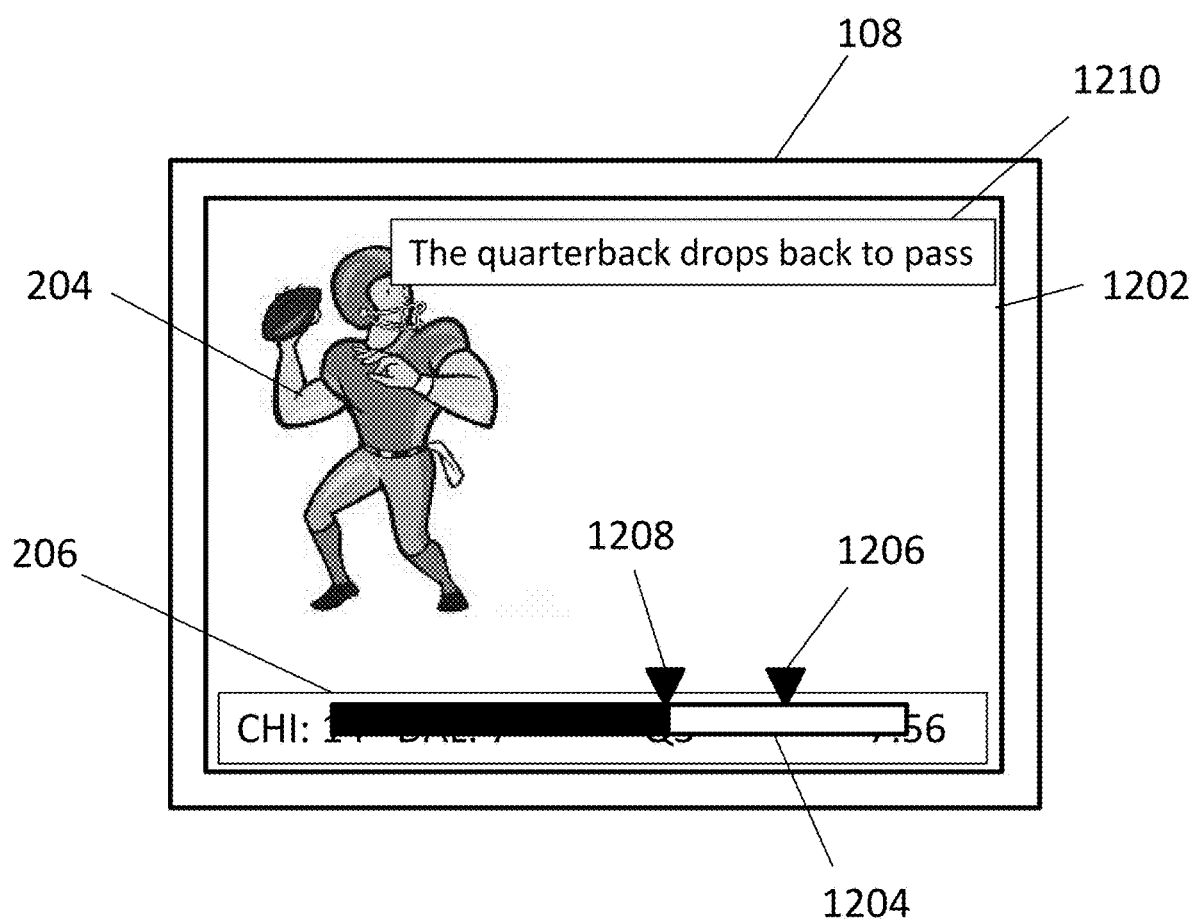
FIG. 12 illustrates rewinding content in accordance with aspects of the present invention.

FIG. 12 illustrates rewinding content in accordance with aspects of the present invention.

As shown in the figure, viewing device 108 includes display 1202, image 204, text 206, rewind bar 1204, initial position indicator 1206, present position indicator 1208, and closed caption 1210.

To avoid the problem of missing desired content while attempting to move, remove, or modify the closed caption box, when the viewer issues the instruction to move, remove, or modify the closed caption box, the content is automatically rewound to a previous point in the content. Status bar 1204 indicates to the viewer the point at which the closed caption modification instruction was sent with initial position indicator 1206 on status bar 1204, and the point at which viewing will resume with the modified closed caption with present position indicator 1208. If the viewer's instruction was to move the closed caption, closed caption 1210 moves to the desired location. The viewer may also decide to change the size or opacity of the closed caption, or remove the closed caption altogether, however for purposes of brevity only the situation in which the closed caption is moved is shown here. Status bar 1204 may remain on the screen for the duration of the closed caption modification, however status bar 1204 may also obscure desired content, so status bar 1204 may appear to show the user initial position indicator 1206 and present position indicator 1208, and then disappear quickly.

After a certain period of time, the closed caption modification instruction will expire, and the closed caption will return to the state it was in prior to the viewer issuing the modification instruction. As a non-limiting example, the period of time may be the time in between present position indicator 1208 and initial position indicator 1206, however any other period of time may be used.

Figure 13:
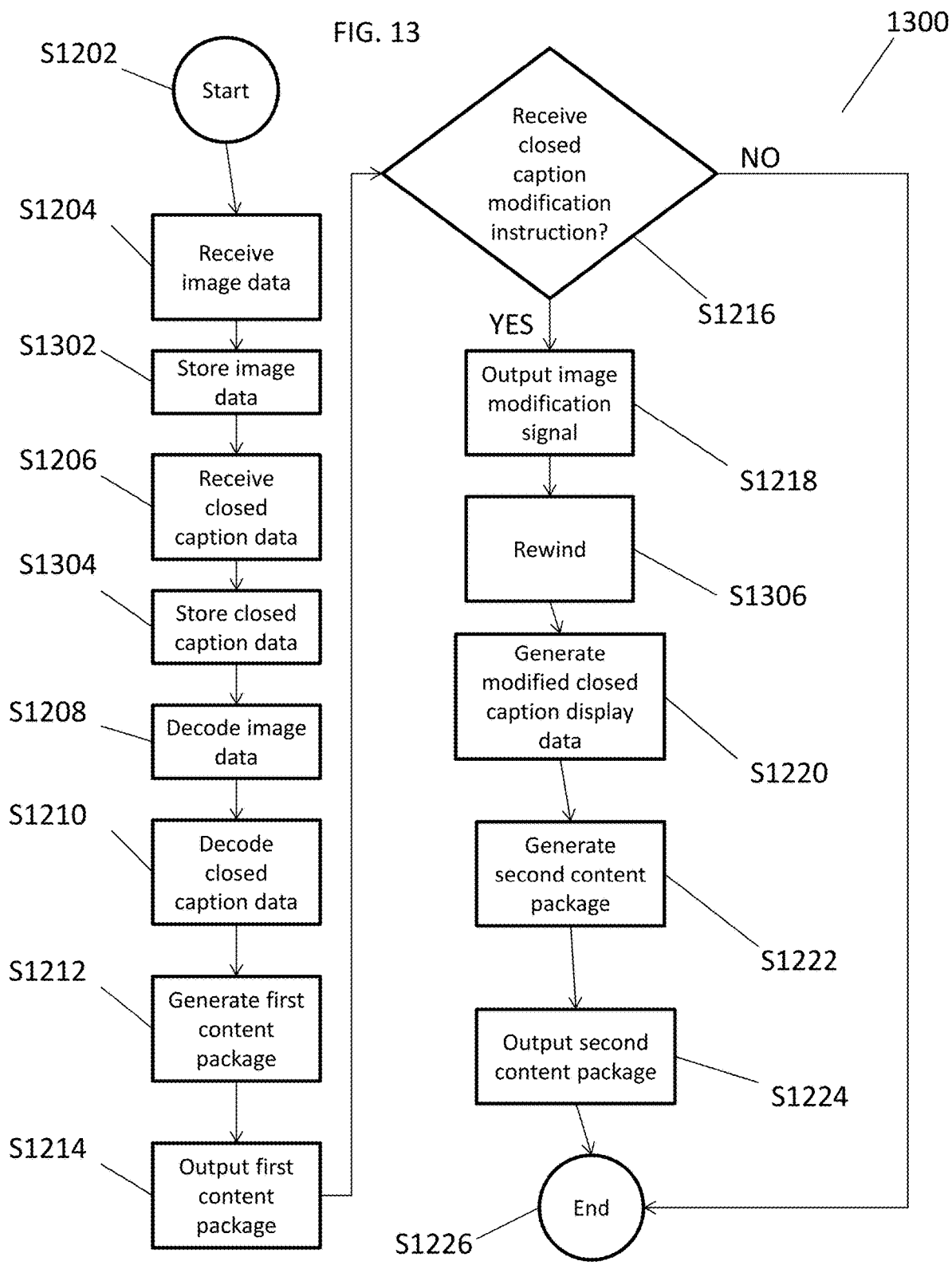
FIG. 13 illustrates another example method to provide different content to viewers based on viewer preference.

FIG. 13 illustrates another example method 1300 to provide different content to viewers based on viewer preference.

A viewer may be watching one type of content and decide to change to watch some other content. As a non-limiting example, the viewer may choose to watch a football game and issues an instruction to the set top box to change the channel in order to watch a football game.

Method 1300 is similar to method 800 discussed above with reference to FIG. 8, however method 1300 includes additional actions to provide the viewer the opportunity to rewind the content after issuing a closed caption modification instruction. Rewinding content in this manner is sometimes referred to as a type of trick play.

As shown in FIG. 13, after the image data and closed caption data are received (S804 and S806, respectively), the image data and closed caption data is stored (S1302 and S1304, respectively). Referring to FIG. 9, closed caption receiver 416 and image receiver 418 send closed caption data and image data to memory 902 to be stored for future use. Referring to FIG. 10, the viewer may want to move closed caption 304 to another location and use the remote control to send an image modification signal to move closed caption 304. While the user is issuing that instruction, though, time is passing and he is missing content while the instruction is being executed.

Referring back to FIG. 13, the image modification signal is output (S818). Returning to FIG. 9, instruction receiver 412 receives the viewer's modification instruction and provides the instruction to memory 902 and closed caption modifying component 414.

Referring back to FIG. 13, the content is rewound so the viewer can view the content that he missed while issuing the image modification instruction (S1306). Returning to FIG. 9, memory 902 determines what stored image data and closed caption data to provide to image decoder 404 and closed caption decoder 406, respectively, based on when the image modification instruction was received. As a non-limiting example, memory 902 may determine that the image modification instruction was received at time $t_1$, but the new image would not be displayed until a later time $t_2$, so memory 902 would provide image and closed caption data associated with $t_1$. Referring to FIG. 10, the viewer may have issued an image modification instruction at the time associated with FIG. 10, so memory 902 will output the image and closed caption data associated with FIG. 10, including image 204, text 206, and closed caption 304. Image decoder 404 then provides image data from memory 902 to packaging component 408, and closed caption decoder 406 provides closed caption data from memory 902 to closed caption modifying component 414.

Referring back to FIG. 13, modified closed caption display data is generated (S820). Returning to FIG. 9, closed caption modifying component 414 receives the modification signal and generates modified closed caption display data based on the modification signal. The modified closed caption display data is then sent to packaging component 408.

Returning to FIG. 13, a second content package is generated (S822). Returning to FIG. 9, packaging component 408 packages the image display data and the modified closed caption display data together to create a second content package that includes both data and sends the second content package to output port 410.

Referring back to FIG. 13, the second content package is then output to the viewer (S824). Returning to FIG. 9, output port 410 sends the second content package to viewing device 108. Referring to FIG. 12, the viewer is now able to see the second content package on display 1202, including image 204, text 206, and closed caption 1210. The viewer can now see all of text 206, instead of just a portion of it, and closed caption 1210 at the same time.

Referring back to FIG. 13, method 1300 ends (S826).

In alternate embodiments, the viewer may choose to modify the closed caption to change its size, as shown in FIG. 6, to change its opacity, as shown in FIG. 7, or to remove the closed caption entirely. In yet other alternate embodiments, the viewer may choose to modify the closed caption in any of the ways described, but only for a short period of time, after which the content displayed would return to its original format. The process by which the closed caption is modified, though, would be the same except for the specific instruction as to how the closed caption should be modified. Therefore, the process described above will apply to any modification instructions initiated by the viewer.

In summary, the present invention provides a system and method to allow a viewer to modify the appearance, location, size, or duration of closed captioning on a viewing device. While watching content, a viewer may choose to modify the closed caption associated with the content such that the closed caption is modified in such a way that allows the viewer to see content that was previously obscured by the closed caption.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a viewing device operable to display a video, said device comprising:
   an image receiver operable to receive image data;
   a closed caption receiver operable to receive closed caption data;
   an image decoder operable to decode the image data into image display data;
   a closed caption decoder operable to decode the closed caption data into closed caption display data;
   a video combining unit which generates a first content package based on a first image display data and the closed caption display data;
   an output port operable to output the first content package to the viewing device to display a first video image over a first period of time;
   an instruction receiver operable to receive a closed caption modification instruction and to output an image modification signal based on the closed caption modification instruction; and
   a closed caption modifying unit which generates modified closed caption display data,
   wherein said video combining unit is further operable, based on the image modification signal, to generate a second content package based on the first image display data and the modified closed caption display data,
   said output port is further operable to output the second content package to the viewing device to display a second video image over a second period of time, and
   the second content package is generated by locating the first image display data corresponding to the first period of time which is previous to the second period of time, and the second video image includes the first image display data and the modified closed caption display, and
   wherein the device further comprises a memory operable to store the image display data and the closed caption display data, said instruction receiver is further operable to receive a trick play closed caption modification instruction and to output a trick play signal based on the trick play closed caption modification instruction, said video combining unit is further operable, based on the trick play signal, to generate a trick play content package based on the image display data and the modified closed caption display data, and said output port is further operable to output the trick play content package to the viewing device to display a trick play video image for rewinding to the first set of image display data corresponding to the first period of time.

2. The device of claim 1, wherein said instruction receiver is operable to receive the closed caption modification instruction via one the group consisting of an infrared transmission and an RF transmission.

3. The device of claim 1,
wherein said video combining unit is operable to generate the first content package such that the first video image on the viewing device includes a first content image based on the image display data and a first closed caption image based on the closed caption display data,
wherein the first closed caption image is disposed at a first location on the viewing device,
wherein said closed caption modifying unit is operable to generate the modified closed caption display data such that the second video image on the viewing device includes a second closed caption image based on the modified closed caption display data, and
wherein the second closed caption image is disposed at a second location on the viewing device.

4. The device of claim 1,
wherein said video combining unit is operable to generate the first content package such that the first video image on the viewing device includes a first content image based on the image display data and a first closed caption image based on the closed caption display data,
wherein the closed caption image has a first transparency,
wherein said closed caption modifying unit is operable to generate the modified closed caption display data such that the second video image on the viewing device includes a second closed caption image based on the modified closed caption display data, and
wherein the second closed caption image has a second transparency that is greater than the first transparency.

5. The device of claim 1,
wherein said video combining unit is operable to generate the first content package such that the first video image on the viewing device includes a first content image based on the image display data and a first closed caption image based on the closed caption display data,
wherein the closed caption image covers a first area,
wherein said closed caption modifying unit is operable to generate the modified closed caption display data such that the second video image on the viewing device includes a second closed caption image based on the modified closed caption display data, and
wherein the second closed caption image covers a second area different than the first area.

6. The device of claim 1,
wherein said video combining unit is operable to generate the first content package such that the first video image on the viewing device includes a first content image based on the image display data and a first closed caption image based on the closed caption display data, and wherein said closed caption modifying unit is operable to generate the modified closed caption display data such that the second video image on the viewing device includes no image based on the closed caption display data.

7. The device of claim 1,
wherein said video combining unit is operable to generate the first content package such that the first video image on the viewing device includes a first content image based on the image display data and a first closed caption image based on the closed caption display data,
wherein said closed caption modifying unit is operable to generate the modified closed caption display data such that the second video image on the viewing device is displayed for a predetermined period of time and such that the second video image on the viewing device includes a second closed caption image based on the modified closed caption display data, and
wherein said video combining unit is operable to again generate the first content package after the predetermined period of time.

8. A method of displaying video on a viewing device, comprising:
receiving, via an image receiver, image data;
receiving, via a closed caption receiver, closed caption data;
decoding, via an image decoder, the image data into image display data;
decoding, via a closed caption decoder, the closed caption data into closed caption display data;
generating, via a packaging component, a first content package based on a first image display data and the closed caption display data;
outputting, via an output port, the first content package to the viewing device to display a first video image over a first period of time;
receiving, via an instruction receiver, a closed caption modification instruction;
outputting, via the instruction receiver, an image modification signal based on the closed caption modification instruction;
generating, via a closed caption modifying component, modified closed caption display data;
generating, via the packaging component and based on the image modification signal, a second content package based on the first image display data and the modified closed caption display data;
outputting, via the output port, the second content package to the viewing device to display a second video image over a second period of time, and
whereby the second content package is generated by locating the first image display data corresponding to the first period of time which is previous to the second period of time, and the second video image includes the first image display data and the modified closed caption display,
wherein the method further comprises storing, via a memory, the image display data and the closed caption display data;
receiving, via the instruction receiver, a trick play closed caption modification instruction;
outputting, via the instruction receiver, a trick play signal based on the trick play closed caption modification instruction;

generating, via the packaging component and based on the trick play signal, a trick play content package based on the image display data and the modified closed caption display data; and outputting, via the output port, the trick play content package to the viewing device to display a trick play video image for rewinding to the first set of image display data corresponding to the first period of time.

9. The method of claim 8, wherein said receiving, via the instruction receiver, the closed caption modification instruction comprises receiving the closed caption modification instruction via one of the group consisting of an infrared transmission and an RF transmission.

10. The method of claim 8,
wherein said generating, via the packaging component, the first content package based on the image display data and the closed caption display data comprises generating the first content package such that the first video image on the viewing device includes a first content image based on the image display data and a first closed caption image based on the closed caption display data,
wherein the first closed caption image is disposed at a first location on the viewing device,
wherein said generating, via the closed caption modifying component, the modified closed caption display data comprises generating the modified closed caption display data such that the second video image on the viewing device includes a second closed caption image based on the modified closed caption display data, and
wherein the second closed caption image is disposed at a second location on the viewing device.

11. The method of claim 8,
wherein said generating, via the packaging component, the first content package based on the image display data and the closed caption display data comprises generating the first content package such that the first video image on the viewing device includes a first content image based on the image display data and a first closed caption image based on the closed caption display data,
wherein the closed caption image has a first transparency,
wherein said generating, via the closed caption modifying component, the modified closed caption display data comprises generating the modified closed caption display data such that the second video image on the viewing device includes a second closed caption image based on the modified closed caption display data, and
wherein the second closed caption image has a second transparency that is greater than the first transparency.

12. The method of claim 8,
wherein said generating, via the packaging component, the first content package based on the image display data and the closed caption display data comprises generating the first content package such that the first video image on the viewing device includes a first content image based on the image display data and a first closed caption image based on the closed caption display data,
wherein the closed caption image covers a first area,
wherein said generating, via the closed caption modifying component, the modified closed caption display data comprises generating the modified closed caption display data such that the second video image on the viewing device includes a second closed caption image based on the modified closed caption display data, and
wherein the second closed caption image covers a second area different than the first area.

13. The method of claim 8,
wherein said generating, via the packaging component, the first content package based on the image display data and the closed caption display data comprises generating the first content package such that the first video image on the viewing device includes a first content image based on the image display data and a first closed caption image based on the closed caption display data, and
wherein said generating, via the closed caption modifying component, the modified closed caption display data comprises generating the modified closed caption display data such that the second video image on the viewing device includes no image based on the closed caption display data.

14. The method of claim 8,
wherein said generating, via the packaging component, the first content package based on the image display data and the closed caption display data comprises generating the first content package such that the first video image on the viewing device includes a first content image based on the image display data and a first closed caption image based on the closed caption display data,
wherein said generating, via the closed caption modifying component, the modified closed caption display data comprises generating the modified closed caption display data such that the second video image on the viewing device is displayed for a predetermined period of time and such that the second video image on the viewing device includes a second closed caption image based on the modified closed caption display data, and
wherein said packaging component is operable to again generate the first content package after the predetermined period of time.

* * * * *